(12) United States Patent
Min et al.

(10) Patent No.: US 8,258,662 B2
(45) Date of Patent: Sep. 4, 2012

(54) ASSEMBLY STRUCTURE OF BEARING AND HOLDER OF BRUSHLESS DC MOTOR

(75) Inventors: Jin Sun Min, Gyunggi-do (KR); Dong Yeon Shin, Gyunggi-do (KR); Jae Yoon Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 78 days.

(21) Appl. No.: 12/773,725

(22) Filed: May 4, 2010

(65) Prior Publication Data
US 2011/0169359 A1 Jul. 14, 2011

(30) Foreign Application Priority Data
Jan. 11, 2010 (KR) .................. 10-2010-0002278

(51) Int. Cl.
*H02K 5/00* (2006.01)
(52) U.S. Cl. ............................. 310/90; 310/91

(58) Field of Classification Search ............... 310/90, 310/67 R, 91
See application file for complete search history.

(56) References Cited

U.S. PATENT DOCUMENTS
6,954,017 B2 * 10/2005 Takahashi et al. ............ 310/85

FOREIGN PATENT DOCUMENTS
JP 2006-038185 2/2006
KR 1020090074349 7/2009
* cited by examiner

*Primary Examiner* — Dang Le
(74) *Attorney, Agent, or Firm* — Blakely Sokoloff Taylor & Zafman LLP

(57) ABSTRACT

Disclosed herein is an assembly structure of a bearing and a holder of a brushless DC motor. The bearing is forcibly fitted into a hollow space formed through the holder. A beveled mouth edge is formed on the upper end of the circumferential inner surface of the holder through which the bearing enters the holder. Therefore, the assembly structure can enhance the workability of the process of assembling the bearing with the holder.

2 Claims, 4 Drawing Sheets

ASSEMBLY STRUCTURE OF BEARING AND HOLDER OF BRUSHLESS DC MOTOR

CROSS REFERENCE TO RELATED APPLICATION

This application claims the benefit of Korean Patent Application No. 10-2010-0002278, filed Jan. 11, 2010, entitled "Assembling structure of bearing and holder of brushless DC motor", which is hereby incorporated by reference in its entirety into this application.

BACKGROUND OF THE INVENTION

1. Technical Field

The present invention relates to an assembly structure of a bearing and a holder of a brushless DC motor.

2. Description of the Related Art

Generally, brushless DC motors have an electronic commutation device, instead of having mechanical contact parts, such as a brush and a commutator, which are provided in a DC motor to alternately supply current. The brushless DC motors are also called commutatorless motors.

Such a brushless DC motor includes a bearing and a holder. The bearing supports a shaft such that it is prevented from being displaced from its proper center axis when the motor is operated. The holder supports the bearing. Typically, the bearing is assembled with the holder in such a way as to forcibly fit the bearing into a hollow space formed through the holder.

FIGS. 1A and 1B are sectional views showing the assembly of a bearing 200 with a holder 100 of a brushless DC motor according to a conventional technique.

As shown in FIGS. 1A and 1B, in the conventional technique, the holder 100 has a hollow space 110 which defines a circumferential inner surface 112 which is planar for its entire length. The bearing 200 has a circumferential outer surface 210 which is planar for its entire length. The bearing 200 is assembled with the holder 100 in such a manner that after the bearing 200 is disposed above the holder 100 (refer to FIG. 1A), the bearing 200 is forcibly fitted into the hollow space 110 of the holder 100 (refer to FIG. 1B). Here, even if just a minute space is present between the bearing 200 and the holder 100, the shaft is displaced from the center axis thereof. To avoid this problem, the holder 100 and the bearing 200 are configured such that the outer diameter of the bearing 200 is almost the same as the inner diameter of the holder 100.

However, in the case where the outer diameter of the bearing 200 is the same as the inner diameter of the holder 100, it becomes difficult to forcibly fit the bearing 200 into the hollow space 110 of the holder 100. In particular, when a mouth edge 120a of the holder 100 through which the bearing 200 enters the holder 100 has a planar structure (a vertical cross-section in the drawings), it is very difficult even to align the bearing 200 with the mouth edge 120a of the holder 100. Furthermore, in this state, when the bearing 200 is forcibly fitted into the holder 100, a bun occurs on the mouth edge 120a of the holder 100, resulting in requiring an additional machining process for removing the burr.

SUMMARY OF THE INVENTION

The present invention has been made in an effort to provide an assembly structure of a bearing and a holder of a brushless DC motor which can enhance the workability of the process of assembling the bearing with the holder.

In an assembly structure of a bearing and a holder of a brushless DC motor according to an embodiment of the present invention, the bearing is forcibly fitted into a hollow space formed through the holder. A beveled mouth edge is formed on the upper end of the circumferential inner surface of the holder through which the bearing enters the holder.

The beveled mouth edge may be inclined from the circumferential inner surface of the holder to the outside of the holder and have an inclined angle ranging from 2° to 12° with respect to the circumferential inner surface of the holder.

Furthermore, a beveled insert edge may be formed on the lower end of the circumferential outer surface of the bearing which enters the holder.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
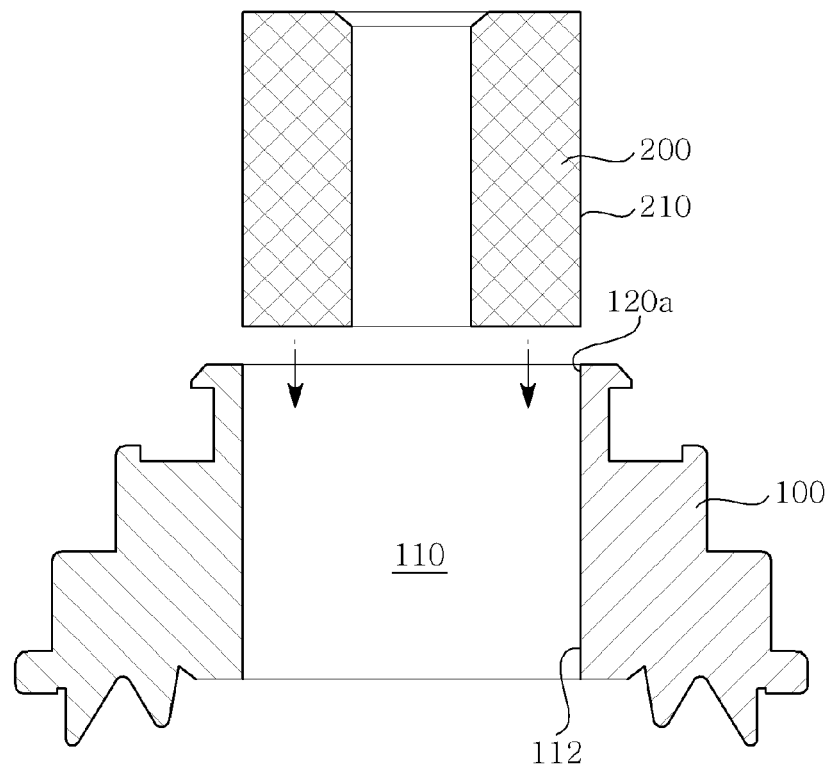
FIGS. 1A and 1B are sectional views showing the assembly of a bearing with a holder of a brushless DC motor according to a conventional technique.
Figure 1B:
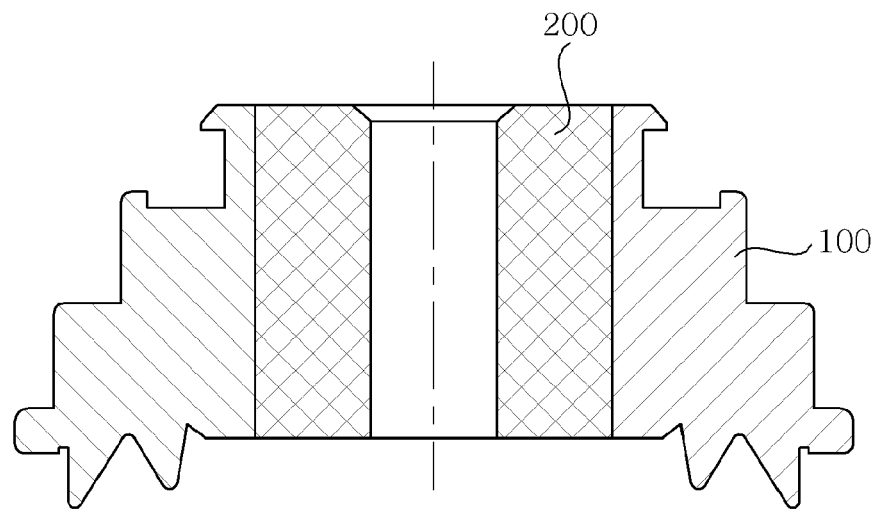

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having had their meanings and concepts adapted to the scope and sprit of the present invention so that the technology of the present invention could be better understood.

Hereinafter, an embodiment of the present invention will be described in detail with reference to the attached drawings.

Figure 2A:
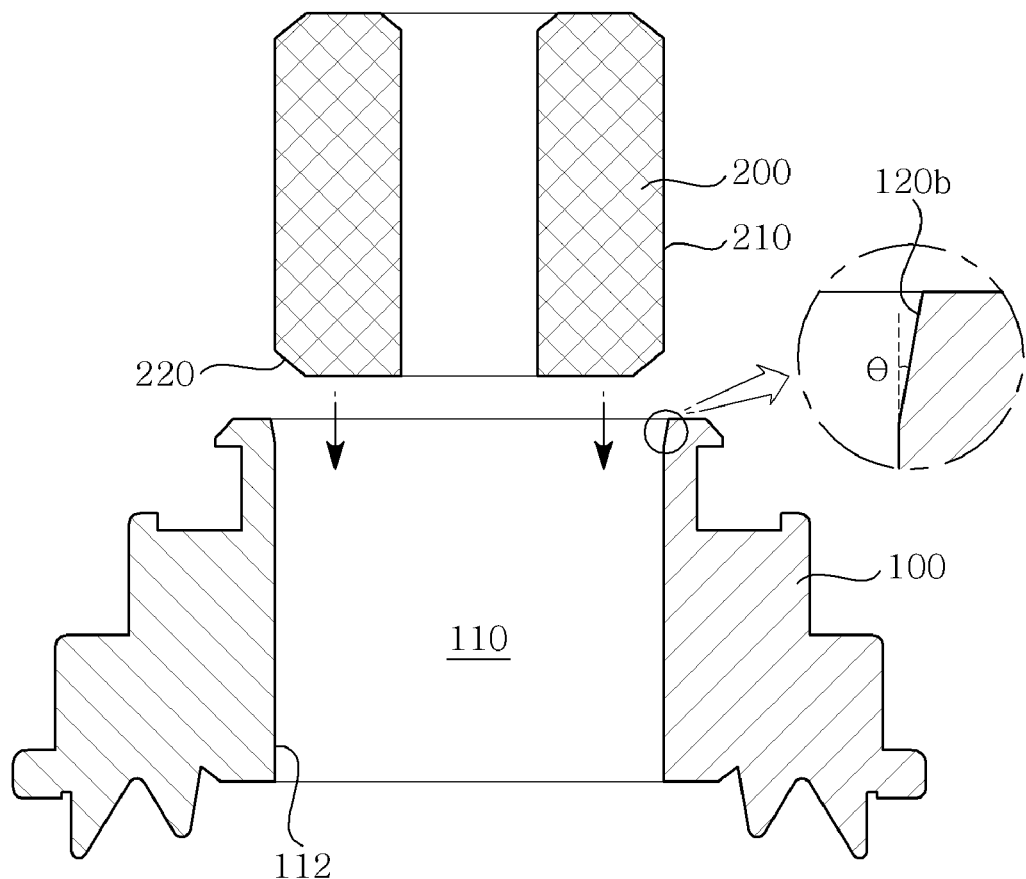
FIGS. 2A and 2B are sectional views showing the assembly of a bearing with a holder of a brushless DC motor, according to an embodiment of the present invention.
Figure 2B:
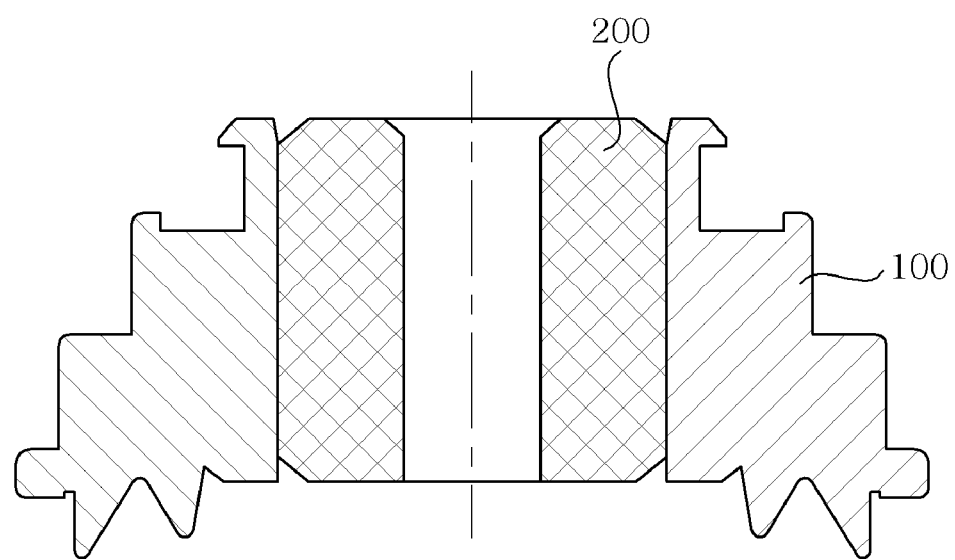
Figure 3:
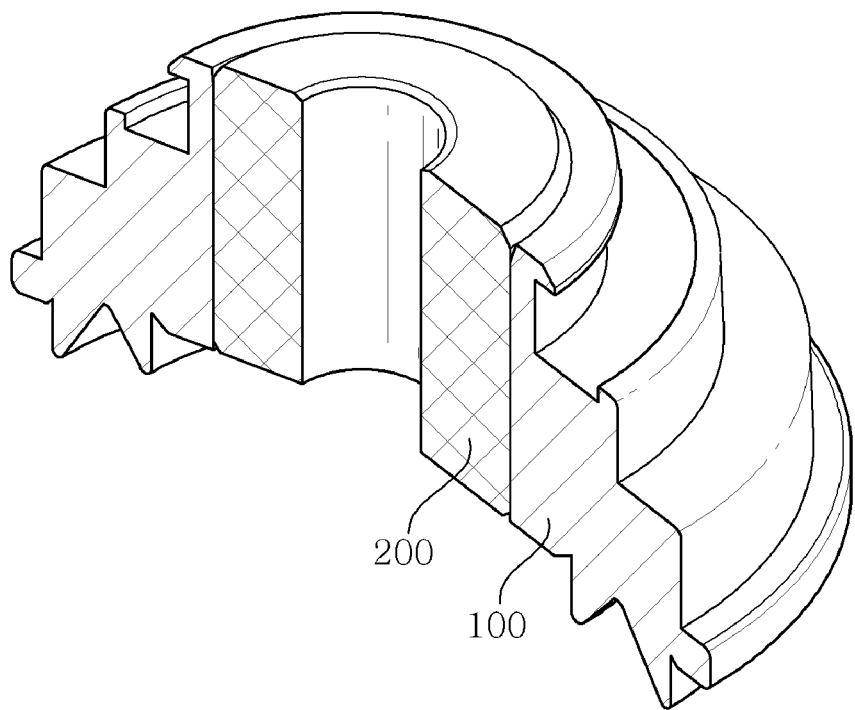
FIG. 3 is a sectional perspective view showing the assembled state of the bearing and the holder of the brushless DC motor of FIG. 2B.

FIGS. 2A and 2B are sectional views showing the assembly of a bearing 200 with a holder 100 of a brushless DC motor, according to the embodiment of the present invention. FIG. 3 is a sectional perspective view showing the assembled state of the bearing 200 and the holder 100 of the brushless DC motor of FIG. 2B. The assembly structure of the bearing 200 and the holder 100 of the brushless DC motor according to the embodiment of the present invention will be explained in detail with reference to these drawings.

As shown in FIGS. 2 (2A and 2B) and 3, in the assembly structure of the bearing 200 and the holder 100 of the brushless DC motor, the bearing 200 is forcibly fitted into a hollow space 110 formed through the holder 100. In addition, a beveled mouth edge 120b is formed on the upper end of the circumferential inner surface of the holder 100 into which the bearing 200 is fitted.

The beveled mouth edge 120b which is formed on the upper end of the holder 100 is inclined upwards from the circumferential inner surface of the holder 100 towards the outside.

After the bearing 200 is disposed above the upper end of the holder 100 having the above-mentioned structure, the bearing 200 is forcibly fitted into the holder 100 in the direction designated by the arrow. In this case, the assemblability in the forcible fitting process can be enhanced, compared to conventional structures in which the upper end of the circumferential inner surface of the holder is planar with respect to the vertical direction. In other words, the beveled mouth edge 120b of the holder 100 functions to guide the bearing 200, in particular, at an initial stage of the insertion process. Therefore, the operation of forcibly fitting the bearing 200 into the holder 100 can be further facilitated.

Here, a beveled insert edge 220 is formed in the lower end of the circumferential outer surface of the bearing 200 which first comes into contact with the beveled mouth edge 120b of the holder 100 when the bearing 200 is fitted into the holder 100. Thus, the fitting of the bearing 200 into the holder 100 can be further facilitated. The beveled insert edge 220 is inclined downwards from the circumferential outer surface of the bearing 200 towards the inside.

Figure 4:
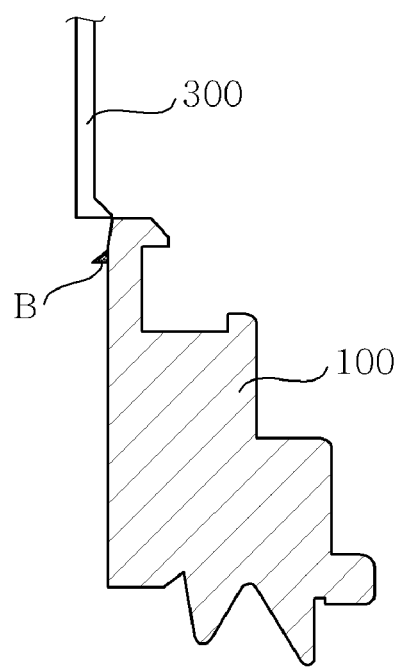
FIG. 4 is a view illustrating a method of machining the holder using a tool according to the present invention.

FIG. 4 is a view illustrating a method of machining the holder 100 using a tool 300.

As shown in FIG. 4, the tool 300 is disposed above the holder 100. In this state, the tool 300 is moved downwards to the holder 100 to machine the holder 100 including the beveled mouth edge 120b. To form the beveled mouth edge 120b, the holder 100 is machined in such a way as to move the tool 300 from a predetermined point of the upper end of the holder 100 to a predetermined point of the circumferential inner surface of the holder 100.

When an angle at which the beveled mouth edge 120b is inclined from the circumferential inner surface of the holder 100 to the outside of the holder 100 is designated by an inclined angle ⊖ of the beveled mouth edge 120b, if the inclined angle ⊖ is relatively large, the angle between a path along which the tool 300 moves when machining the beveled mouth edge 120b and a path along which the tool 300 moves when machining the circumferential inner surface of the holder 100 becomes large. In this case, the problem of a burr B occurring at the junction between the beveled mouth edge 120b and the circumferential inner surface of the holder 100 may arise. To avoid this problem, the speed with which the tool 300 machines the holder 100 must be reduced, or after a primary machining process has been conducted, a separate secondary machining process for removing the burr B must be conducted.

Figure 5:
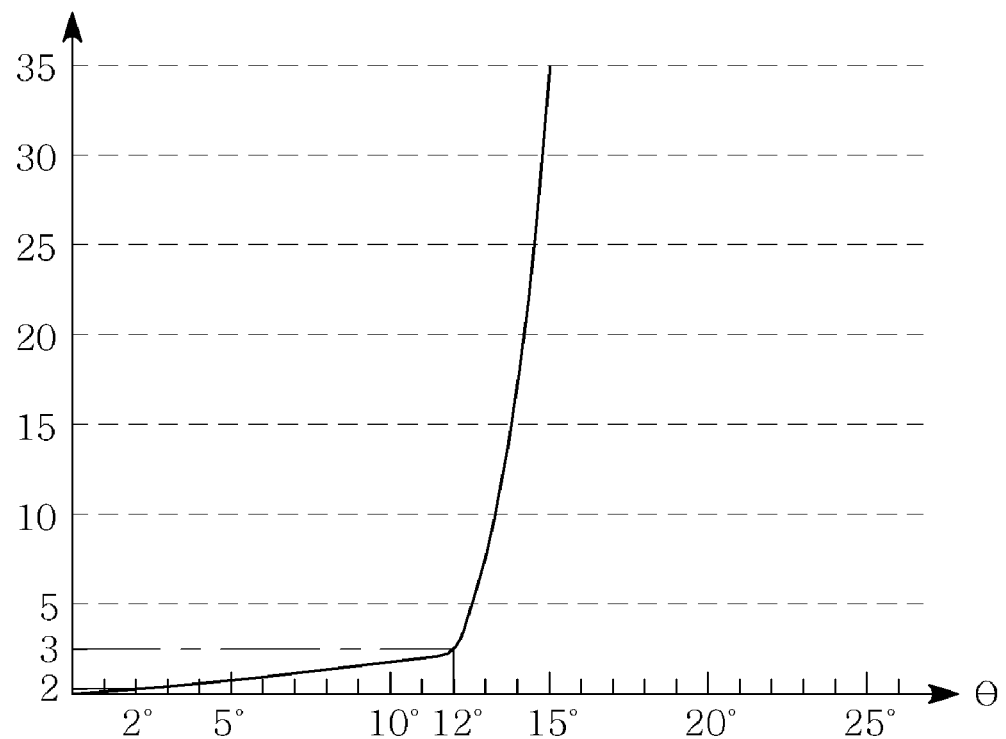
FIG. 5 is a graph showing the size of a bun as a function of an inclined angle of a beveled mouth edge of the holder when machining the holder according to the present invention.

FIG. 5 is a graph showing the size of a burr B as a function of the inclined angle ⊖ of the beveled mouth edge 120b of the holder 100 when machining the holder 100.

As shown in FIG. 5, it is to be appreciated that as the inclined angle ⊖ of the beveled mouth edge 120b is increased, the size of the burr B is increased. In detail, when the inclined angle ⊖ of the beveled mouth edge 120b is 12° or more, the size of the burr B rapidly increases. Here, saying that the size of the burr B is large is equivalent in meaning to saying that the amount of burr B is large. On the other hand, when the inclined angle ⊖ of the beveled mouth edge 120b is less than 2°, the purpose of facilitating the insertion of the bearing 200 into the holder 100 cannot be achieved. Therefore, in order to achieve the intended purpose of facilitating the insertion of the bearing 200 into the holder 100 and minimize the amount of burr B, the beveled mouth edge 120b of the holder 100 has an inclined angle ⊖ ranging from 2° to 12°.

As described above, in the present invention, a holder has a beveled mouth edge. Therefore, when a bearing is assembled with the holder, the beveled mouth edge of the holder guides the bearing, thus enhancing the workability of the assembly of the bearing with the holder. In addition, because a load with which the bearing is forcibly fitted into the holder can be reduced, the roundness of the inner diameter of the bearing can be enhanced. Hence, the characteristics (pertaining to lifetime, vibrations, noise, etc.) of the brushless DC motor can be improved.

Furthermore, in the present invention, the beveled mouth edge of the holder has an inclined angle ranging from 2° to 12°. Therefore, an incidence rate of a burr can be minimized. Thus, it is not required to vary a machining speed of a tool or to perform an additional secondary machining process for removing a burr.

Although the embodiments of the present invention have been disclosed for illustrative purposes, it will be appreciated that the assembly structure of the bearing and the holder of the brushless DC motor according to the invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An assembly structure of a bearing and a holder of a brushless DC motor, wherein the bearing is forcibly fitted into a hollow space formed through the holder, and a beveled mouth edge is formed on an upper end of a circumferential inner surface of the holder through which the bearing enters the holder, and is inclined from the circumferential inner surface of the holder to the outside of the holder, and has an inclined angle ranging from 2 to 12 degrees with respect to the circumferential inner surface of the holder.

2. The assembly structure as set forth in claim 1, wherein a beveled insert edge is formed on a lower end of a circumferential outer surface of the bearing which enters the holder.

* * * * *